: 3,440,296
Patented Apr. 22, 1969

3,440,296
PURE BINARY ADDITION COMPOUNDS
David G. Walker, Baytown, Tex., assignor to Esso Research and Engineering Company, a corporation of Delaware
No Drawing. Continuation of application Ser. No. 307,345, Sept. 9, 1963. This application Nov. 29, 1967, Ser. No. 686,781
Int. Cl. C07c 7/00; C01f 7/48; B01d 3/34
U.S. Cl. 260—674    9 Claims This application is a continuation of Ser. No. 307,345, filed Sept. 9, 1963, now abandoned.

The present invention is directed to a method for preparing pure metal halide:aluminum halide binary addition compounds. More particularly, the invention deals with preparing pure metal halide:aluminum halide binary addition compounds for use in separating aromatic isomers. In its more specific aspects it has been found that metal halide:aluminum halide binary addition compounds, wherein the metal of said metal halide is selected from the group consisting of $Cu^{+1}$, $Ag^{+1}$, $Sn^{+2}$ and $Pb^{+2}$ and the halide of the metal halide and the aluminum halide is selected from the group consisting of Cl and Br, may be prepared in substantially pure form for use in separating aromatic isomers.

The present invention may be briefly described as a method for preparing metal halide:aluminum halide binary addition compounds wherein the metal of the metal halide is selected from $Cu^{+1}$, $Ag^{+1}$, $Sn^{+2}$ and $Pb^{+2}$ and the halide is selected from Cl and Br which comprises fusing at least a stoichiometric amount of the metal halide with an aluminum halide and thereafter heating the fused product until at least three percent by weight of aluminum halide is removed from the fused product.

Binary compounds of metal halides and aluminum halides have been prepared by fusing a metal halide with an aluminum halide to produce the compound of the structure, $M^n(AlX_4)_n$, where $n$ is the valence of the metal and X is a halide usually Cl or Br. In fusing the metal halide with the aluminum halide, it has been though that the desired binary addition compound would be made by merely using an excess of the metal halide. However, it has been found that pure metal aluminum halide binary addition compounds are not produced by merely fusing the metal halide with the aluminum halide. In the fusing of the compounds, free aluminum chloride or aluminum bromide as well as the anion $(Al_2X_7)^-$ are trapped in small amounts in the metal aluminum halide structure. Throughout the specification and claims, X is to be considered a halide selected from chlorine and bromine. The entrapment of free aluminum halide and the $(Al_2X_7)^-$ anion gives to the fused product a substantial Friedel-Crafts catalytic activity. According to the present invention, these catalytically active impurities are removed from the fused product by heating the fused product until at least three percent by weight of aluminum halide is removed therefrom. The active $(Al_2X_7)^-$ anion upon heating breaks down to volatilize free aluminum halide ½ $(Al_2X_6)$ and leave $(AlCl_4)^-$.

In the practice of the present invention it was found that of the metal halide:aluminum halide binary addition compounds which may be produced, only the metal halides of $Cu^{+1}$, $Ag^{+1}$, $Sn^{+2}$ and $Pb^{+2}$ produced substantially pure, catalytically inactive binary addition compounds. Other metals even when fused and heated to remove substantial amounts of aluminum halide apparently could not be purified to remove the catalytically active impurities. Thus, the metal halides which may be utilized in the present invention are selected from CuCl, CuBr, AgCl, AgBr, $SnCl_2$, $SnBr_2$, $PbCl_2$ and $PbBr_2$. The foregoing metal halides are fused with either anhydrous aluminum chloride $(Al_2Cl_6)$ or anhydrous aluminum bromide $(Al_2Br_6)$.

The fusing of metal halides and aluminum halides is accomplished at different temperatures depending upon the metal halide. The mere fusing of an aluminum halide and a metal halide, however, is not a part of the present invention. In accordance with the present invention, the fused product of the select metal halides described above and the aluminum halide is heated until at least three percent by weight of the aluminum halide is removed from the fused product to form the substantially pure binary addition compounds of the present invention which are catalytically inactive. It has been found that a catalytically inactive binary addition compound is formed if between about 3% and about 7% of the aluminum halide is removed from the fused product. The aluminum halide is removed by heating the fused product under vacuum to a temperature within the range of about 150° to about 200° C. for about 1 to about 2 hours. Continued heating or higher temperatures will remove more aluminum halide; however, the aluminum halide thus removed does not come from the free aluminum halide or the $(Al_2X_7)^-$ anion, but comes from the breakdown of the metal binary addition compound. It is to be noted that continued heating is not detrimental to the use of the binary addition compounds for separating aromatic isomers since the metal halides themselves are not catalytically active.

A preferred method for preparing the metal halide:aluminum halide binary addition compounds of the present invention is to place at least a stoichiometric amount of the metal halides of the present invention together with an aluminum halide into a tube having an extended reduced portion which may be sealed. However, before the tube is sealed, the mixture is heated to remove water and other impurities, evacuated and then sealed. The tube is then placed in a furnace until the metal halids and aluminum halide fuse. Thereafter, the tube is placed in the furnace such that the extended portion is placed outside the furnace while the tube portion containing the fused product remains inside the furnace. The fused product is then heated to about 200° C. for about 2 hours during which time any volatilized aluminum halide condenses in the extended cool portion of the tube outside of the furnace. The mere breaking of the tube and discarding of the extended reduced portion with the volatile materials yields the desired binary addition compound of the present invention as the non-volatile portion of the fused product.

The pure metal halide:aluminum halide binary addition compounds of the present invention are utilized in separating aromatic isomers. It has been found that the pure binary addition compounds formed ternary addition compounds with aromatics. The relative stability of the ternary addition compounds enables the selective removing on one aromatic from a mixture of the ternary addition compounds with other aromatics. Accordingly, the separating ability of the pure binary addition compounds is unique in that aromatics which cannot be easily separated by known techniques are effectively separated. It is to be noted that the separation is not based on basicity, but it has been found that often an opposite effect is shown. By basicity is meant the ability of the aromatic to accept a proton. It is important, however, that a pure metal halide:aluminum halide binary addition compound be used for an effective separation since this will prevent disproportionation and transalkylation reactions of the aromatics from occurring.

No general rules may be set forth with regard to which aromatic may be separated from aromatic mixtures. The present invention is most useful in separating aromatics which according to known methods are difficult to separate. Accordingly, the present invention is illustrated by the following examples which illustrate the invention but are not to be considered limiting.

In the examples the binary addition compounds of the metal halide and aluminum halide are formed and mixed with artificial blends of aromatics, and then the separation of the aromatics is accomplished by vacuum distillation. It is to be noted, however, that the vacuum distillation is only one of several techniques which may be used to separate are aromatic. The vacuum distillation shows the relative fugacity of the respective aromatics in a mixture of aromatic ternary compounds. Thus, the separation of a single aromatic from a mixture of aromatics is accomplished by the staged complexing and decomplexing of the aromatics. The separation is accomplished due to the difference in the relative fugacities of the different aromatics. It is to be noted that the staged complexing and decomplexing takes place by the mixing of the pure metal halide:aluminum binary addition compounds with the aromatic wherein all the aromatic compounds apparently complex and form aromatic ternary compounds while the decomplexing is accomplished by vacuum distillation or liquid washing techniques or by other techniques which will remove the aromatic from the aromatic ternary compounds.

EXAMPLE I

A binary addition compound was formed by fusing 11.4 g. (0.080 mol) AgCl and 10.0 g. (0.0375 mol) $Al_2Cl_6$ under an atmosphere of $N_2$. A 50–50 blend of o-xylene and ethylbenzene (12.7334 g., 0.12 mol) was added to the fused product heated to 60° C. and then placed on a mechanical shaker for 2 hours after which the sample stood overnight. The sample was then fractionated as shown, and a residuel solid remained.

mixture was shaken for 15 hours at 25° C., then fractionated as indicated below.

TABLE II.—ANALYSIS GPC, WT. PERCENT

| Cut | 1 | 2 | 3 | 4 | 5 | 6 | 7 |
|---|---|---|---|---|---|---|---|
| Temp., ° C | 25 | 25 | 50 | 70 | 85 | 100 | (1) |
| Benzene | 4.4 | 18.8 | 11.1 | 7.21 | 1.1 | 0.8 | 0.3 |
| Toluene | 0.5 | 1.8 | 1.3 | 1.2 | 0.6 | 0.3 | |
| Ethylbenzene | 57.7 | 30.7 | 40.0 | 34.0 | 10.8 | 9.2 | 2.1 |
| m-Xylene | 3.8 | 23.9 | 32.5 | 5.3 | 69.0 | 80.5 | 3.0 |
| p-Xylene | 32.0 | | | 22.7 | | | 92.0 |
| o-Xylene | 4.9 | 6.6 | 9.6 | 7.6 | 3.7 | 5.8 | 3.2 |
| Σ $C_9$ or $C_{10}$ equals aromatics | | 18.2 | 14.9 | 21.5 | 14.3 | 3.1 | |

[1] To liquid.

It is to be noted that the residual solid which was substantially the binary addition compound of silver chloride and aluminum chloride, after having been fused, still exhibits considerable catalytic activity. Thus, while p-xylene and ethylbenzene are fractionated by vacuum distillation in 7 cuts with the p-xylene being present in the last cut at about 92 percent by weight, disproportionation and transalkylation occur.

From the foregoing examples, the importance of a catalytically pure binary addition compound can be seen. In the following examples the metal halide:aluminum halide binary compounds were prepared in the preferred manner of the invention as described hereinbefore. Thus, in each instance the fused product was heated to remove from 3% to about 7% of aluminum halide.

EXAMPLE III

A sample (0.0138 mol) of $Pb(AlCl_4)_2$ was prepared, deactivated by the preferred method and shaken with the following mixture: 1.30 g. mesitylene, 1.00 g. pseudocumene and 4.32 g. toluene. A homogenous liquid solution resulted. The solution was vacuum distilled into fractions.

TABLE III.—ANALYSIS GPC, WT. PERCENT

| Cut | 1 | 2 | 3 | 4 | 5 | 6 | 7 |
|---|---|---|---|---|---|---|---|
| Temp., ° C | 25 | 50 | 75 | 100 | 130 | 150 | 170 |
| Toluene | 95.3 | 85.8 | 87.5 | 27.3 | 4.3 | 1.6 | 0.95 |
| Ethyl Φ | | | | 1.2 | 1.4 | 1.1 | |
| m-plus p- xylene | | | | 0.4 | 0.7 | 0.9 | |
| m-plus p- o-ethyltoluene, 5.4 | | | | 0.9 | | | |
| o-Ethyltoluene plus mesitylene, 39.4 | 4.7 | 5.9 | 5.5 | 39.5 | 65.2 | 60.0 | 67.2 |
| Pseudocumene, 55.1 | | 7.9 | 6.9 | 30.8 | 28.5 | 36.1 | 32.1 |
| Percent mesitylene on $C_9$ | 41.0 | 43.0 | 44.0 | 56.4 | 69.5 | 61.6 | 68.0 |

TABLE I.—TABULATED RESULTS, GPC [1]

| | Feed | Sample No. | | | | | | | |
|---|---|---|---|---|---|---|---|---|---|
| | | 1 | 2 | 3 | 4 | 5 | 6 | 7 | 8 |
| Temp., ° C | | 25 | 25 | 25–30 | 45–60 | 45–60 | 80 | 100 | 100 |
| Grams | | 2.60 | 1.22 | 2.68 | 1.68 | 0.54 | 1.14 | 1.99 | 0.45 |
| Percent off | | 20.4 | 30.0 | 51.1 | 64.3 | 68.5 | 77.5 | 93.1 | 96.5 |
| Components, Wt. Percent | | | | | | | | | |
| Benzene | | 34.3 | 9.2 | 9.5 | 4.7 | 4.9 | 3.0 | 1.0 | 0.8 |
| Toluene | | | | | | | | Trace | 0.5 |
| Ethylbenzene | 51.3 | 42.2 | 45.8 | 40.0 | 31.2 | 27.8 | 20.4 | 13.6 | 5.6 |
| m- plus p-xylene | | 0.3 | 0.5 | .5 | 0.6 | 0.7 | 0.5 | 3.4 | 5.4 |
| o-Xylene | 48.7 | 22.0 | 36.7 | 38.7 | 41.8 | 38.6 | 50.8 | 64.2 | 40.0 |
| 1,3-diethylbenzene | | 0.8 | 5.8 | 4.4 | 7.8 | 8.1 | 7.3 | 1.5 | 6.8 |
| 1,2-plus 1,4-diethylbenzene | | 0.3 | 2.1 | 2.0 | 3.5 | 5.5 | 3.2 | Trace | 1.7 |
| 1,2-dimethyl-4-ethylenzene | | | | 4.4 | 10.5 | 14.4 | 14.7 | 16.1 | 30.1 |
| Ratio o-xylene/ethylbenzene | 0.95 | 0.52 | 0.80 | 9.7 | 1.34 | 1.89 | 2.5 | 4.72 | 7.18 |

[1] Gas Partition Chromatography.

It is to be noted that the mere fusing of the silver chloride and aluminum chloride gave a reagent which caused considerable disproportionation and transalkylation of the aromatics to occur during decomplexing. While it can be seen that ethylbenzene and o-xylene may be separated, the use of a pure metal halide:aluminum halide binary compound would result in the formation of only small amounts of other aromatics.

EXAMPLE II

The residual solid from Example I was mixed with a 7075 g. blend of 50–50 p-xylene and ethylbenzene. The In a similar manner $Pb(AlCl_4)_2$ may separate ethylbenzene from the xylenes.

EXAMPLE IV $Ag(AlCl_4)$ was prepared by fusing together silver chloride and aluminum chloride in equimolar quantities. The resulting solid was dissolved in boiling benzene and filtered. Upon cooling of the benzene solution, a solution of the composition, Ag(Benzene) ($AlCl_4$), crystallized out of the benzene solution. Heating of this compound to 150° C. in a vacuum quantitatively drove off the benzene to leave a solid Ag(AlCl$_4$). The resultant solid had at least 3% less aluminum chloride than the fused solid.

This Ag(AlCl$_4$) was mixed with a blend of 50% p-xylene and 50% m-xylene in anol proportion, respectively, of 1.0 to 1.3. The mixture was warmed to 60° C. and shaken to form the solid Ag(aromatic) (AlCl$_4$) addition compound. The sample was then placed in a vacuum with a cold trap to freeze out any volatile off gases. By heating the sample at different temperatures, the following fractions were made:

TABLE IV

| Cut | Time of Heating, Hours | Temp., ° C. | Composition of Fraction, Wt. Percent | |
|---|---|---|---|---|
| | | | m-Xylene | p-Xylene |
| 1 | 0.25 | 25 | 46.5 | 53.5 |
| 2 | 1.5 | 25 | 54.5 | 45.5 |
| 3 | 0.5 | 60 | 63.2 | 36.8 |
| 4 | 0.5 | 100 | 44.0 | 56.0 |
| 5 | 0.5 | 100 | 23.9 | 76.1 |
| 6 | 0.5 | 150 | 7.6 | 92.4 |

The uniqueness of the metal halide:aluminum halide binary addition compounds of the present invention to be used in effective separations is illustrated by the following examples.

EXAMPLE V

Li(AlCl$_4$) was made by fusing LiCl and ½Al$_2$Cl$_6$ together in a tube and treating in the preferred manner to make catalytically inactive. The solid Li(AlCl$_4$), 0.07 mol, formed was shaken vigorously at 25° C. with 0.055 mol of a 50% m-xylene-50% p-xylene mixture. The sample was then fractionally distilled under vacuum into fractions.

TABLE V

| Cut | Time of Heating, Hours | Temp., ° C. | Composition of Fraction, Wt. Percent | |
|---|---|---|---|---|
| | | | m-Xylene | p-Xylene |
| 1 | 0.5 | 25 | 50.8 | 49.2 |
| 2 | 0.5 | 25 | 53.3 | 46.7 |
| 3 | 0.5 | 55 | 53.8 | 46.2 |
| 4 | 0.5 | 95 | 46.1 | [1] 48.8 |

[1] This sample also contained 23% toluene, 0.7% xylene and 2.4% C$_9$ aromatics.

EXAMPLE VI

Cd(AlCl$_4$)$_2$, 0.058 g. mol, was combined with 8.58 g. (0.081 mol) xylenes heated as usual and cut-up.

TABLE VI

| Cut | Vacuum Cut-up | | GPC, Percent | | | |
|---|---|---|---|---|---|---|
| | Temp., ° C. | Toluene | m-Xylene | p-Xylene | o-Xylene | C$_9$ |
| 1 | 25 | 0.9 | 46.4 | 52.6 | 0.3 | |
| 2 | 40 | 0.3 | 55.4 | 44.6 | 0.3 | |
| 3 | 60 | 0.5 | 52.2 | 46.6 | 0.4 | |
| 4 | 80 | 1.5 | 55.1 | 43.0 | 1.4 | |
| 5 | 100 | 5.8 | 58.5 | 30.8 | 4.3 | |
| 6 | 150 | 7.9 | 57.6 | 29.1 | 3.1 | 0.7 |

The nature and objects of the present invention having been completely described and illustrated and the best mode contemplated set forth, what I wish to claim as new and useful and secure by Letters Patent is:

1. A method for preparing a catalytically inactive metal halide: aluminum halide binary addition compound which comprises fusing at least a stoichiometric amount of a metal halide with an aluminum halide wherein said metal of said metal halide is selected from the group consisting of Cu$^{+1}$, Ag$^{+1}$, Sn$^{+2}$, and Pb$^{+2}$ and the halide of the metal halide and the aluminum halide is selected from the group consisting of Cl and Br to form a fused product, and heating said fused product until at least 3% by weight of aluminum halide is removed from said fused product.

2. A method in accordance with claim 1 wherein said fused product is heated until about 3% to about 7% of aluminum halide is removed from said fused product.

3. A method in accordance with claim 1 wherein said fused product is heated to a temperature within the range of about 150° to about 200° C. for a period of about one to about two hours.

4. A method for preparing a catalytically inactive metal halide: aluminum halide addition compound which comprises fusing at least a stoichiometric amount of metal halide with an aluminum halide wherein said metal of said metal halide is selected from the group consisting of Cu$^{+1}$, Ag$^{+1}$, Sn$^{+2}$, and Pb$^{+2}$ and the halide of the metal halide and the aluminum halide is selected from the group consisting of chlorine and bromine to form a fused product, dissolving said fused product in an aromatic selected from the group consisting of benzene and toluene, removing any undissolved solids, cooling the resultant solution whereby a ternary addition compound is crystallized out of the solution, and heating said ternary addition compound to quantitatively drive off said aromatic.

5. A method for preparing a catalytically inactive silver halide: aluminum halide addition compound which comprises fusing at least a stoichiometric amount of silver halide with an aluminum halide wherein said halide is selected from the group consisting of chlorine and bromine to form a fused product, dissolving said fused product in an aromatic selected from the group consisting of benzene and toluene, removing any undissolved solids, cooling the resultant solution whereby a ternary addition compound is crystallized out of the solution, and heating said ternary addition compound to quantitatively drive off said aromatic.

6. A method in accordance with claim 4 wherein said metal is copper.

7. A method for separating aromatic isomers from a mixture containing mesitylene and pseudocumene which comprises:
   complexing said mixture of aromatic isomers with a catalytically pure solid lead halide: aluminum halide binary addition compound wherein said halide is selected from the group consisting of Cl and Br, and
   decomplexing the aromatic ternary compounds which are formed by vacuum distillation.

8. A method for separating aromatic isomers from a mixture containing p-xylene and m-xylene which comprises:
   complexing said mixture of aromatic isomers with a catalytically pure solid silver halide: aluminum halide binary addition compound wherein said halide is selected from the group consisting of Cl and Br, and
   decomplexing the aromatic ternary compounds which are formed by vacuum distillation.

9. A method for separating aromatic isomers by the staged complexing and decomplexing of a mixture of aromatic isomers with a binary metal halide: aluminum halide addition compound which comprises complexing said mixture of aromatic isomers with a catalytically pure solid metal halide: aluminum halide addition compound wherein said metal of said metal halide is selected from the group consisting of Cu$^{+1}$, Ag$^{+1}$, Sn$^{+2}$, and Pb$^{+2}$ and the halide of the metal halide and the aluminum halide is selected from the group consisting of Cl and Br, and decomplexing the aromatic ternary compounds which are formed to recover said isomers and said solid metal halide: aluminum halide addition compound.

References Cited

UNITED STATES PATENTS 2,810,002  10/1957  Scott et al. ......... 260—674

OTHER REFERENCES

Thomas, Anhydrous Aluminum Chloride in Organic Chemistry, p. 42 relied on, Reinhold Publishing Corporation, New York, N.Y., 1941.

DELBERT E. GANTZ, Primary Examiner.

C. E. SPRESSER, JR., Assistant Examiner.

U.S. Cl. X.R.

23—87, 92, 93, 205; 260—672; 203—28, 29, 51